(12) United States Patent
Zhong et al.

(10) Patent No.: US 10,099,307 B2
(45) Date of Patent: Oct. 16, 2018

(54) INTERCONNECT ALLOY MATERIAL AND METHODS

(71) Applicant: Intel Corporation, Santa Clara, CA (US)

(72) Inventors: Ting Zhong, Tigard, OR (US); Rajashree Raji Baskaran, Portland, OR (US); Aleksandar Aleksov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/676,679

(22) Filed: Aug. 14, 2017

(65) Prior Publication Data
US 2017/0361390 A1 Dec. 21, 2017

Related U.S. Application Data

(62) Division of application No. 13/801,803, filed on Mar. 13, 2013, now Pat. No. 9,731,369.

(51) Int. Cl.
| | |
|---|---|
| *B23K 1/00* | (2006.01) |
| *B23K 1/20* | (2006.01) |
| *B23K 3/06* | (2006.01) |
| *B23K 3/08* | (2006.01) |
| *B23K 35/02* | (2006.01) |
| *B23K 35/24* | (2006.01) |
| *B23K 35/26* | (2006.01) |

(Continued)

(52) U.S. Cl.
CPC ............. *B23K 1/20* (2013.01); *B23K 1/0016* (2013.01); *B23K 1/206* (2013.01); *B23K 3/0623* (2013.01); *B23K 3/08* (2013.01); *B23K 35/025* (2013.01); *B23K 35/0244* (2013.01); *B23K 35/24* (2013.01); *B23K 35/26* (2013.01); *B23K 35/302* (2013.01); *B23K 35/3033* (2013.01); *B23K 2201/42* (2013.01)

(58) Field of Classification Search
CPC ............... B23K 35/025; B23K 1/0016; B23K 2201/36; B23K 2201/42; C22C 28/00; C22C 1/02
See application file for complete search history.

(56) References Cited

U.S. PATENT DOCUMENTS

| | | |
|---|---|---|
| 4,398,975 A | 8/1983 | Ohsawa |
| 4,659,384 A | 4/1987 | Daigo et al. |

(Continued)

OTHER PUBLICATIONS

"U.S. Appl. No. 13/801,803, Advisory Action dated Jul. 5, 2016", 2 pgs.

(Continued)

*Primary Examiner* — Erin B Saad
(74) *Attorney, Agent, or Firm* — Schwegman Lundberg & Woessner, P.A.

(57) ABSTRACT

A solder and methods of forming an electrical interconnection are shown. Examples of solders include gallium based solders. A solder including gallium is shown that includes particles of other solders mixed with a gallium based matrix. Methods of applying a solder are shown that include swiping a solder material over a surface that includes a resist pattern. Methods of applying a solder are also shown that include applying a solder that is immersed in an acid solution that provides a fluxing function to aid in solder adhesion.

8 Claims, 7 Drawing Sheets

(51) Int. Cl.
*B23K 35/30* (2006.01)
*B23K 101/42* (2006.01)

(56) References Cited

U.S. PATENT DOCUMENTS

| 5,001,829 | A | * | 3/1991 | Schelhorn | H05K 3/3442 |
|---|---|---|---|---|---|
| | | | | | 118/697 |
| 9,731,369 | B2 | | 8/2017 | Zhong et al. | |
| 2006/0180245 | A1 | | 8/2006 | Wicker et al. | |
| 2014/0263588 | A1 | | 9/2014 | Zhong et al. | |

OTHER PUBLICATIONS

"U.S. Appl. No. 13/801,803, Examiner Interview Summary dated Mar. 22, 2016", 3 pgs.
"U.S. Appl. No. 13/801,803, Final Office Action dated Jan. 18, 2017", 7 pgs.
"U.S. Appl. No. 13/801,803, Final Office Action dated Apr. 20, 2016", 7 pgs.
"U.S. Appl. No. 13/801,803, Final Office Action dated May 22, 2015", 6 pgs.
"U.S. Appl. No. 13/801,803, Non Final Office Action dated Jan. 14, 2014", 6 pgs.
"U.S. Appl. No. 13/801,803, Non Final Office Action dated Aug. 12, 2016", 6 pgs.
"U.S. Appl. No. 13/801,803, Non Final Office Action dated Sep. 11, 2014", 7 pgs.
"U.S. Appl. No. 13/801,803, Non Final Office Action dated Dec. 21, 2015", 8 pgs.
"U.S. Appl. No. 13/801,803, Notice of Allowance dated Apr. 10, 2017", 7 pgs.
"U.S. Appl. No. 13/801,803, Respnse filed Mar. 20, 2017 to Final Office Action dated Jan. 18, 2017", 5 pgs.
"U.S. Appl. No. 13/801,803, Response filed Mar. 21, 2016 to Non Final Office Action dated Dec. 21, 2015", 5 pgs.
"U.S. Appl. No. 13/801,803, Response filed Apr. 14, 2014 to Non Final Office Action dated Jan. 14, 2014".
"U.S. Appl. No. 13/801,803, Response filed Apr. 23, 2015 to Restriction Requirement dated Feb. 24, 2015", 3 pgs.
"U.S. Appl. No. 13/801,803, Response filed Nov. 14, 2016 to Non Final Office Action dated Aug. 12, 2016", 6 pgs.
"U.S. Appl. No. 13/801,803, Response filed Nov. 23, 2015 to Final Office Action dated May 22, 2015", 4 pgs.
"U.S. Appl. No. 13/801,803, Response filed Dec. 11, 2014 to Non Final Office Action dated Sep. 11, 2014", 6 pgs.
"U.S. Appl. No. 13/801,803, Response filed Dec. 16, 2013 to Restriction Requirement dated Nov. 15, 2013", 4 pgs.
"U.S. Appl. No. 13/801,803, Response filed Aug. 22, 2014 ti /funak Iffuce /actuin dated May 22, 2014", 5 pgs.
"U.S. Appl. No. 13/801,803, Restriction Requirement dated Feb. 24, 2015", 6 pgs.
"U.S. Appl. No. 13/801,803, Restriction Requirement dated Nov. 15, 2013", 10 pgs.
"U.S. Appl. No. 13/801,803, Response filed Jun. 20, 2016 to Final Office Action dated Apr. 20, 2016", 5 pgs.
"Composite", www.dictionary.com, (Dec. 15, 2015), 6 pgs.
Baldwin, D. F, et al., "Gallium alloy interconnects for flip-chip assembly applications", IEEE Transactions on Components and Packaging Technologies, 23(2), (Jun. 2000), 360-366.
Baldwin, Daniel F., "Gallium Alloy Interconnects for Flip Chip Assembly Applications", (Jan. 1, 2000).

\* cited by examiner

INTERCONNECT ALLOY MATERIAL AND METHODS

PRIORITY APPLICATION

This application is a divisional of U.S. application Ser. No. 13/801,803, filed Mar. 13, 2013, which is incorporated herein by reference in its entirety.

TECHNICAL FIELD

Embodiments described herein generally relate to electrical interconnections in microelectronic devices.

BACKGROUND

Microelectronic devices such as IC (integrated circuit) packages may contain low k-value dielectric materials with low mechanical strength. Thermal stresses during manufacture can damage such materials. Some solutions to this problem include providing stiffeners to components such as chips and packages. Other solutions include thickening the components or otherwise changing their geometry to withstand the thermal stresses. Other solutions include choosing materials with better matching thermal expansion coefficients. It is desirable to further improve technologies that reduce damage to electronic components during manufacture.

DESCRIPTION OF EMBODIMENTS

The following description and the drawings sufficiently illustrate specific embodiments to enable those skilled in the art to practice them. Other embodiments may incorporate structural, logical, electrical process, and other changes. Portions and features of some embodiments may be included in, or substituted for, those of other embodiments. Embodiments set forth in the claims encompass all available equivalents of those claims.

Figure 1:
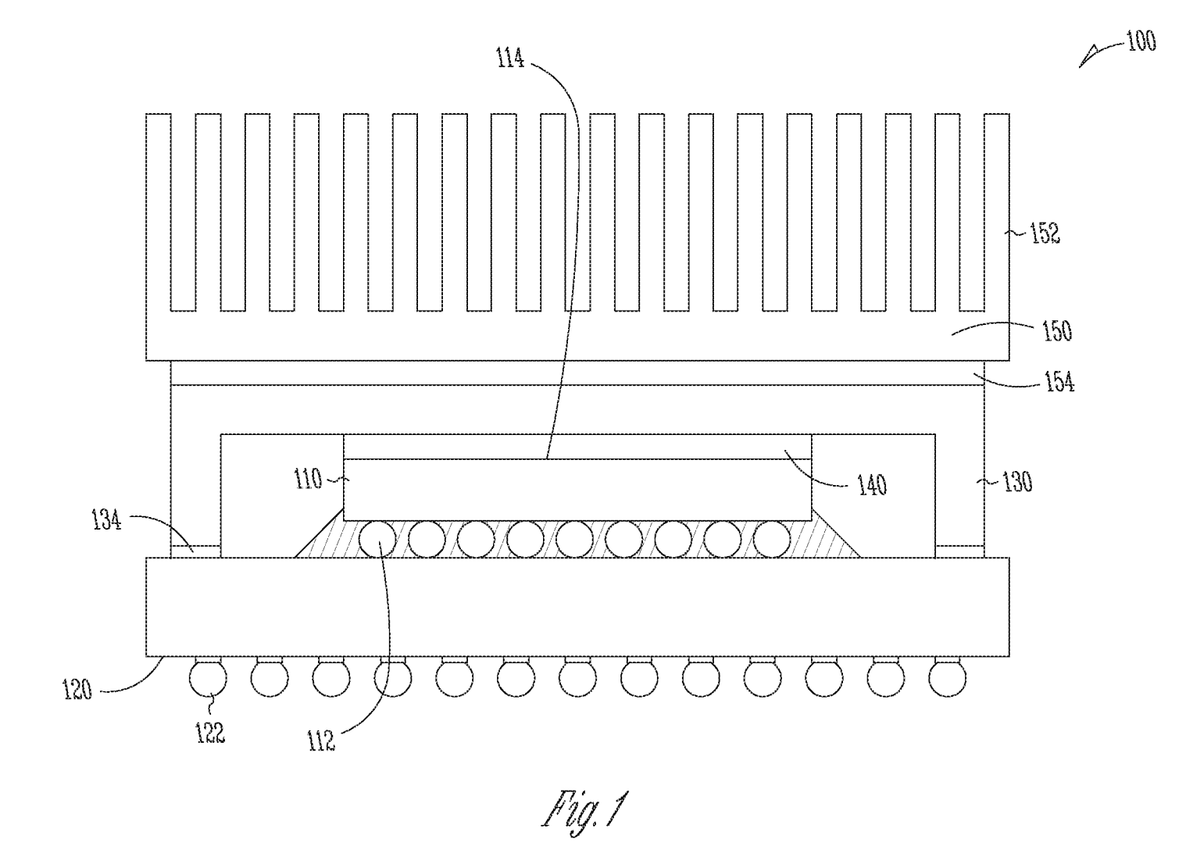
FIG. 1 is a cross section view of an IC package in accordance with some embodiments of the invention.

FIG. 1 shows a cross-sectional representation of an IC package 100. In embodiments where the IC die is a processor die, the IC package can be termed a processor assembly. IC package 100 includes an IC die 110 mounted in "flip-chip" orientation with its active side facing downward to couple with an upper surface of a substrate 120, through interconnections 112 such as solder balls or bumps. The substrate 120 also shows a second number of first level interconnections 122 on its opposite surface for mating with additional packaging structures such as boards (not shown).

Die 110 generates its heat from internal structure, including wiring traces, located near its active side; however, a significant portion of the heat is dissipated through its back side 114. Heat that is concentrated within the die is dissipated to a large surface that is in contact with the die in the form of an integrated heat spreader 130. A thermal interface material 140 is often provided between the die 110 and integrated heat spreader 130. In one embodiment, to further dissipate heat from the integrated heat spreader 130, a heat sink 150 optionally having fins 152 is coupled to the integrated heat spreader 130.

Figure 2A:
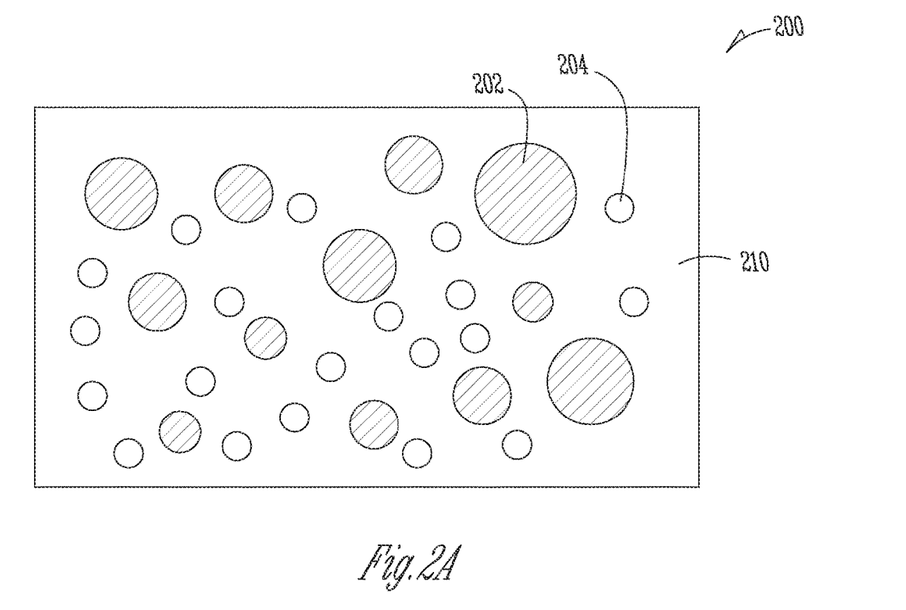
FIG. 2A-2B are simplified cross sections of a solders in accordance with some embodiments of the invention.
Figure 2B:
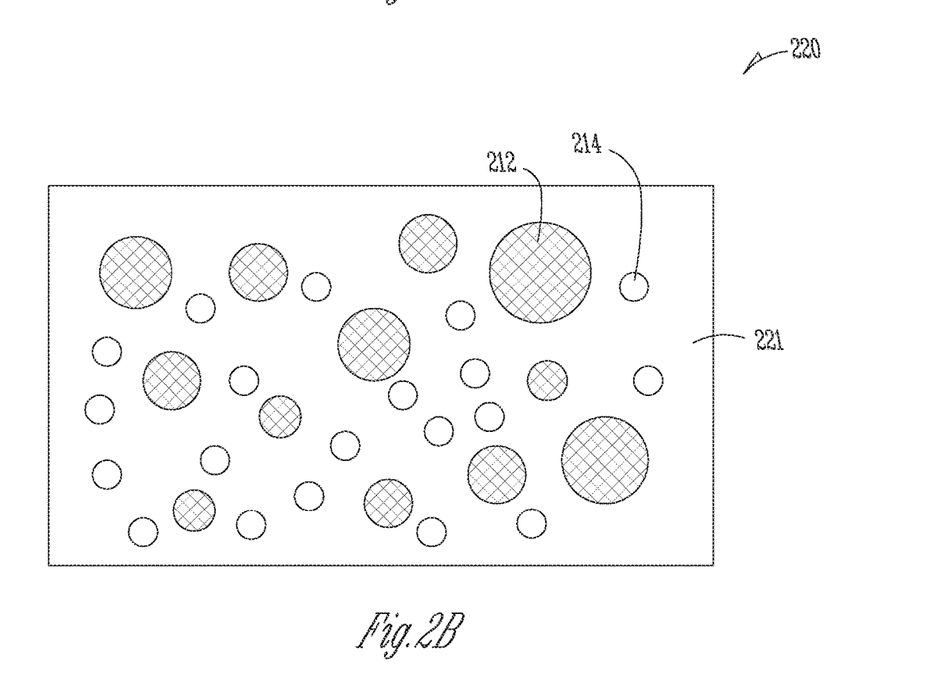

FIGS. 2A-2B show some examples of solder materials 200, 220 with melting points that are lower than melting points of current solders. In one example, the solder materials 200, 220 melt at a temperature between approximately 100° C. and 250° C. In one example, the solder materials 200, 220 melt at a temperature between approximately 120° C. and 200° C. Using a solder with a melting temperature that is lower than melting points of current solders allows electronic devices such as IC package 100 from FIG. 1 to be manufactured at a lower temperature. Using lower temperatures reduces thermal stresses on components of the IC package 100, and leads to higher manufacturing yields of existing component geometries and/or allows more aggressive thinning of components. In addition to the interconnection levels 112 and 122 shown as examples in FIG. 1, solder materials shown in the present disclosure may be used in other microelectronic applications, such as between stacked silicon dies in a multiple die package.

There are a number of technical challenges involved in applying solder to interconnections such as interconnections 112 and 122 shown in FIG. 1. As many as several thousand interconnection pads may require application of solder in a typical IC device. While solders discussed below provide a number of advantages such as reduced thermal stresses during a soldering operation, there are unique solder processing challenges that are associated with the solder compositions described, including but not limited to solder stability before and during application, and chemically reacting the solder to form an interconnection. Methods of using these solders are further discussed in embodiments below.

In one example, the solder materials 200, 220 include gallium metal. One interconnection mechanism of gallium metal based solders includes a reaction with another metal, such as copper or nickel, to form an intermetallic compound with a higher melting temperature, that is stable at electronic device operating temperatures. In one example, a source of metal to react with gallium includes an interconnection bond pad, which may be made of copper or a copper alloy. In one example, a source of metal to react with gallium includes metal particles mixed with the gallium. In one example, a source of metal to react with gallium includes both metal particles mixed with the gallium and metal from an interconnection bond pad.

The solder 200 of FIG. 2A is a composite solder, including dispersed phase components and a matrix component. FIG. 2A shows a number of dispersed phase solder particles 202 and a gallium based matrix material 210 surrounding the dispersed phase solder particles 202. In one example, the dispersed phase solder particles 202 include indium tin solder. In one example, the dispersed phase solder particles 202 include silver tin solder. Although indium tin and silver tin solders are used as examples, other solders are within the scope of the invention. In one example, the gallium based matrix material 210 includes substantially pure gallium metal. In one example, the gallium based matrix material 210 includes a gallium metal alloy.

In one example, as illustrated in FIG. 2A, a distribution of metal particles 204 are further included in the solder 200. In one example, the metal particles 204 include copper metal particles. In one example, the metal particles 204 include nickel metal particles. In one example, the metal particles 204 include multiple types of metal particles, such as both nickel and copper. In one example particle size of metal particles is approximately 200 mesh particle size. In one example particle size of metal particles includes particles between approximately 1 and 10 microns in diameter. In one example, substantially all metal particles are approximately 1 micron in diameter. In one example a metal particle fraction in the composite solder is between approximately 1 percent and 30 percent by volume. In one example a metal particle fraction in the composite solder is approximately 50 percent by volume.

Another example of a composite solder 220 is shown in FIG. 2B. The composite solder 220 includes dispersed phase components and a matrix component. FIG. 2B shows a number of dispersed phase gallium metal particles 212 and a solvent matrix material 221 surrounding the dispersed phase gallium metal particles 212. In one example the gallium metal particles 212 are formed by sonicating liquid gallium metal in the solvent 221. The solvent keeps the liquid gallium metal particles separated, and stable at room temperature. Examples of solvents include, but are not limited to, alcohols containing four to twelve carbon atoms, such as isopropyl alcohol; alkanes with six to eight carbon atoms, such as hexane; PEG (polyethylene glycol) for example, PEG with molecular weight less than 2000 mol weight; and ketones which are liquids, such as acetone, water, and oil. In one example, gallium metal particles immersed in a solvent include gallium metal particles of approximately 1 to 10 microns in size.

Similar to the solder 200 from FIG. 2A, in one example, a distribution of metal particles 214 are further included in the solder 220. In one example, the metal particles 214 include copper metal particles. In one example, the metal particles 214 include nickel metal particles. In one example, the metal particles 214 include multiple types of metal particles, such as both nickel and copper.

Figure 3A:
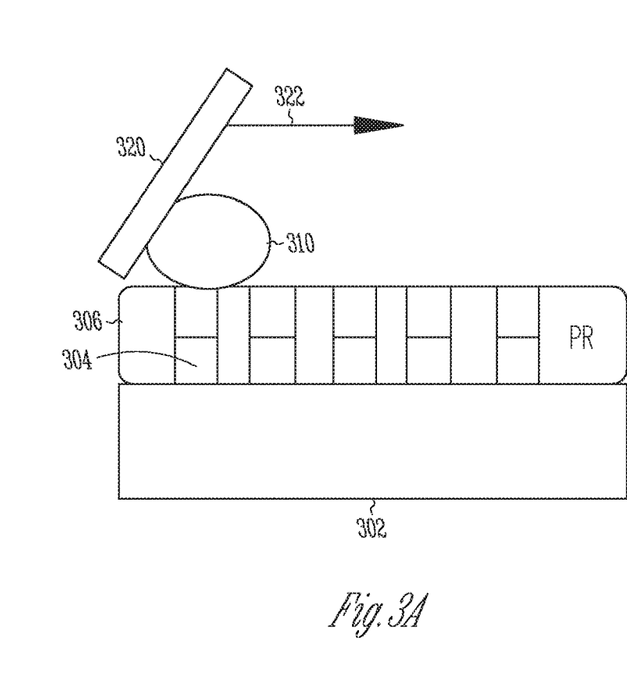
FIG. 3A-3D are process diagrams of a method in accordance with some embodiments of the invention.
Figure 3B:
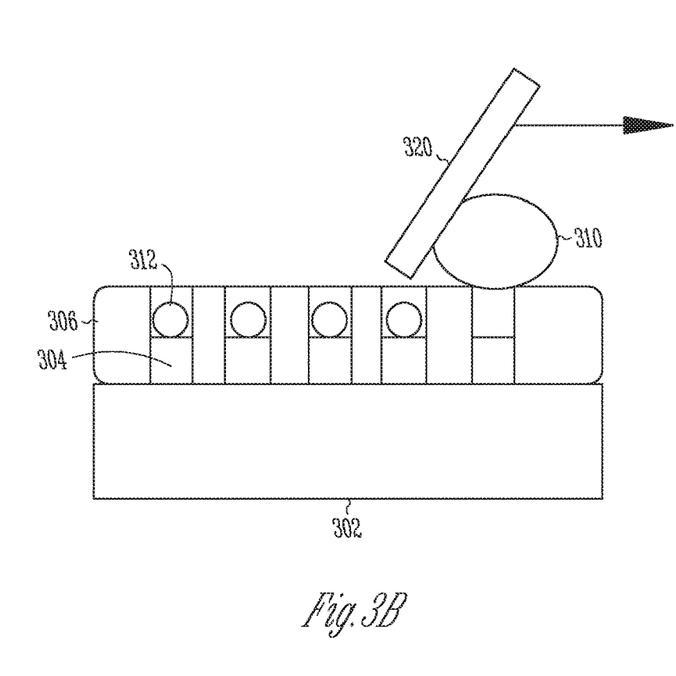

FIGS. 3A-3D show steps in an example process of forming an electrical interconnect using solders as described above. In FIG. 3A, a resist pattern 306 is formed surrounding exposed electrical contacts 304 located on a surface of an electronic device 302 such as an IC device. An amount of solder 310 is placed on the exposed electrical contacts 304. In the example of FIGS. 3A-3D, a blade 320 is drawn across the resist pattern 306 along direction 322 to spread the solder 310 into openings in the resist pattern 306. In FIG. 3B, an amount of solder 312 is located over each electrical contact 304 within opening in the resist pattern 306.

Figure 3C:
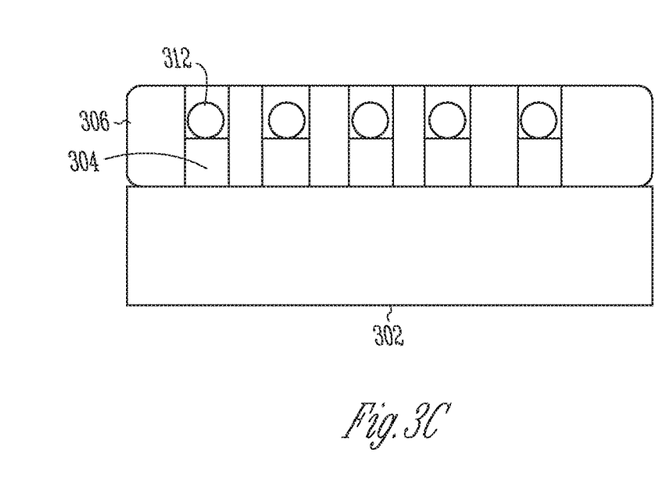
Figure 3D:
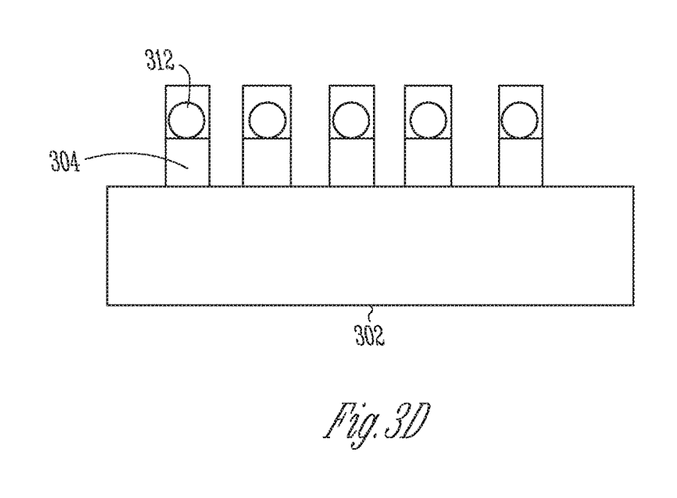

In FIG. 3C, the amount of solder 312 on each electrical contact 304 is heated to a temperature sufficient to reflow the amount of solder 312 and consolidate the amount of solder 312 into a solder ball. In FIG. 3D, the resist pattern 306 is removed using standard lithographic techniques, leaving the reflowed balls of solder 312 on each electrical contact 304. In subsequent operations (not shown), the electronic device 302 is placed over corresponding electrical contact pads on another surface, such as a board, and the assembly is heated to complete the soldering operation and form an electrical interconnection. As described above, in one example, metal from the electrical contacts reacts with gallium in the amount of solder 312 to form an intermetallic composition with a higher melting temperature that the unreacted solder. In one example, metal from additional metal particles mixed within the solder reacts with gallium to form an intermetallic composition with a higher melting temperature that the unreacted solder.

Figure 4A:
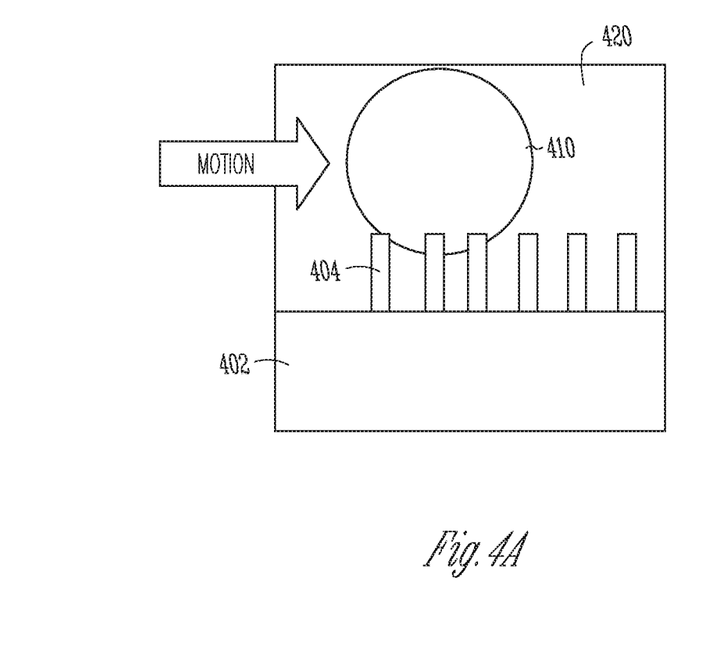
FIG. 4A-4B shows process diagrams of another method in accordance with some embodiments of the invention.
Figure 4B:
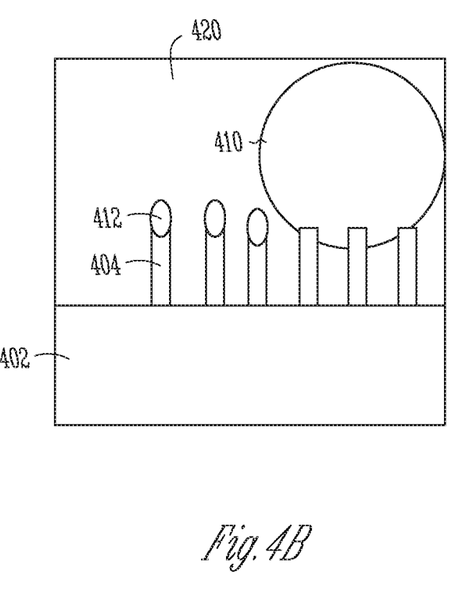

FIGS. 4A-4B show steps in another example process of forming an electrical interconnect using solders as described above. In FIG. 4A, an amount of solder 410 immersed in an acid solution 420 is drawn across a surface of an electronic device 402 such as an IC device. In one example, the acid solution 420 removes an oxide that may be present on a surface of an electrical contact 404, or otherwise fluxes the electrical contact 404 to prepare the surface for adhesion of the solder 410. In FIG. 4B, an amount of solder 410 is deposited over a surface of each electrical contact 404. In one example, a resist pattern similar to the resist pattern 306 from FIGS. 3A-3C is used in conjunction with solder 410 and acid solution 420.

Figure 5:
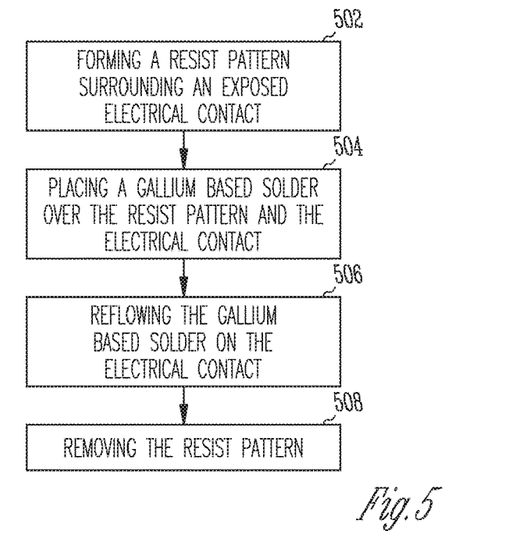
FIG. 5 is a flow diagram of another method in accordance with some embodiments of the invention.

FIG. 5 shows a flow diagram of another method of soldering according to an embodiment of the invention. In operation 502, a resist pattern is formed surrounding an exposed electrical contact. In operation 504, a gallium based solder, such as a solder described in examples above, is placed over the resist pattern and the electrical contact. In operation 506, the gallium based solder is reflowed on the electrical contact, and in operation 508, the resist pattern is removed. In one example, the reflow operation of 506 is useful to consolidate gallium particles from a composite solder. Particle based solder configurations described in selected examples above may have certain advantages is solder stability prior to application, and in efficiency of application to a large array of interconnections on a surface. After the solder is in place on an interconnection, reflowing the solder forms a stable solder ball on a surface of the interconnection, and readies the device for coupling to an adjacent component such as a board, a package substrate, or a semiconductor chip.

Figure 6:
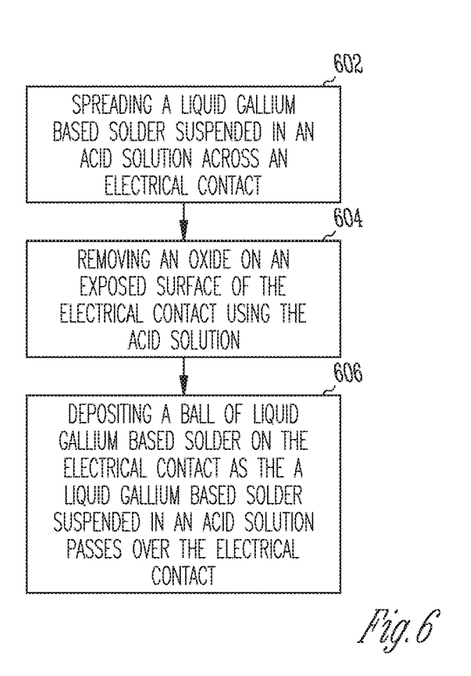
FIG. 6 is a flow diagram of another method in accordance with some embodiments of the invention.

FIG. 6 shows a flow diagram of another method of soldering according to an embodiment of the invention. In operation 602, a liquid gallium based solder suspended in an acid solution is spread across an electrical contact. In operation 604, an oxide on an exposed surface of the electrical contact is removed using the acid solution. In operation 606, a ball of liquid gallium based solder is deposited on the electrical contact as the a liquid gallium based solder suspended in an acid solution passes over the electrical contact.

Figure 7:
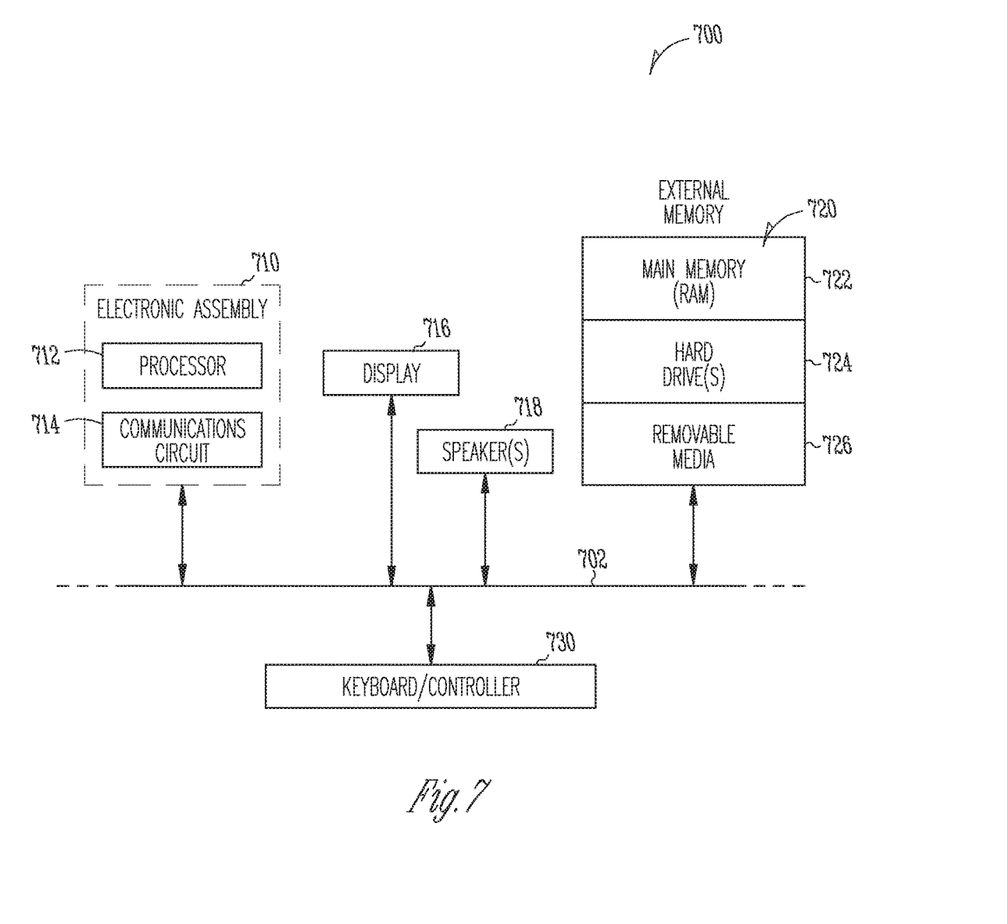
FIG. 7 is block diagram of an electronic system in accordance with some embodiments of the invention.

An example of an electronic device using semiconductor chip assemblies and solders as described in the present disclosure is included to show an example of a higher level device application for the present invention. FIG. 7 is a block diagram of an electronic device 700 incorporating at least one solder and/or method in accordance with at least one embodiment of the invention. Electronic device 700 is merely one example of an electronic system in which embodiments of the present invention can be used. Examples of electronic devices 700 include, but are not limited to personal computers, tablet computers, mobile telephones, game devices, MP3 or other digital music players, etc. In this example, electronic device 700 comprises a data processing system that includes a system bus 702 to couple the various components of the system. System bus 702 provides communications links among the various components of the electronic device 700 and can be implemented as a single bus, as a combination of busses, or in any other suitable manner.

An electronic assembly 710 is coupled to system bus 702. The electronic assembly 710 can include any circuit or combination of circuits. In one embodiment, the electronic assembly 710 includes a processor 712 which can be of any type. As used herein. "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 710 are a custom circuit, an application-specific integrated circuit (ASIC), or the like, such as, for example, one or more circuits (such as a communications circuit 714) for use in wireless devices like mobile telephones, personal data assistants, portable computers, two-way radios, and similar electronic systems. The IC can perform any other type of function.

The electronic device 700 can also include an external memory 720, which in turn can include one or more memory elements suitable to the particular application, such as a main memory 722 in the form of random access memory (RAM), one or more hard drives 724, and/or one or more drives that handle removable media 726 such as compact disks (CD), flash memory cards, digital video disk (DVD), and the like.

The electronic device 700 can also include a display device 716, one or more speakers 718, and a keyboard and/or controller 730, which can include a mouse, trackball, touch screen, voice-recognition device, or any other device that permits a system user to input information into and receive information from the electronic device 700.

To better illustrate the method and apparatuses disclosed herein, a non-limiting list of embodiments is provided here:

Example 1 includes a composite solder, including, a number of dispersed phase solder particles, and a gallium based matrix material surrounding the dispersed phase solder particles.

Example 2 includes the composite solder of claim 1, wherein the dispersed phase solder particles includes indium tin solder particles.

Example 3 includes the composite solder of any one of examples 1-2, wherein the dispersed phase solder particles includes silver tin solder particles.

Example 4 includes the composite solder of any one of examples 1-3, wherein the gallium based matrix material includes substantially pure gallium metal.

Example 5 includes the composite solder of any one of examples 1-4, wherein the gallium based matrix material includes gallium metal particles immersed in a solvent.

Example 6 includes the composite solder of any one of examples 1-5, wherein the solvent is chosen from a list consisting of alcohols containing four to twelve carbon atoms, alkanes with six to eight carbon atoms, poly ethylene glycol, and liquid ketones.

Example 7 includes the composite solder of any one of examples 1-6, further including a distribution of metal particles within the gallium based matrix material.

Example 8 includes the composite solder of any one of examples 1-7 wherein the metal particles include copper particles.

Example 9 includes a method, including forming a resist pattern surrounding an exposed electrical contact, placing a gallium based solder over the resist pattern and the electrical contact, reflowing the gallium based solder on the electrical contact, and removing the resist pattern.

Example 10 includes the method of example 9, wherein placing a gallium based solder over the resist pattern and the electrical contact includes placing a number of gallium based particles suspended in a solvent matrix over the resist pattern and the electrical contact.

Example 11 includes the composite solder of any one of examples 9-10, wherein placing a gallium based solder over the resist pattern and the electrical contact includes placing a composite solder over the resist pattern and the electrical contact, wherein the composite solder includes a liquid gallium based matrix with indium tin solder particles in suspension within the liquid gallium based matrix.

Example 12 includes the composite solder of any one of examples 9-11, wherein placing a gallium based solder over the resist pattern and the electrical contact includes placing a composite solder over the resist pattern and the electrical contact, wherein the composite solder includes a liquid gallium based matrix with copper particles in suspension within the liquid gallium based matrix.

Example 13 includes the composite solder of any one of examples 9-12, wherein a copper fraction in the composite solder is between approximately 1 percent and 30 percent by volume.

Example 14 includes the composite solder of any one of examples 9-13, wherein placing a gallium based solder over the resist pattern and the electrical contact includes placing a liquid gallium based solder suspended in an acid solution over the resist pattern and the electrical contact.

Example 15 includes the composite solder of any one of examples 9-14, wherein placing a gallium based solder over the resist pattern and the electrical contact includes spreading a gallium based solder over the resist pattern and across an array of thousands of electrical contacts.

Example 16 includes the composite solder of any one of examples 9-15, wherein spreading the gallium based solder includes spreading the gallium based solder across an array of first level interconnect structures in a chip package.

Example 17 includes a method, including spreading a liquid gallium based solder suspended in an acid solution across an electrical contact, removing an oxide on an exposed surface of the electrical contact using the acid solution, and depositing a ball of liquid gallium based solder on the electrical contact as the a liquid gallium based solder suspended in an acid solution passes over the electrical contact.

Example 18 includes the method of example 17, wherein spreading a liquid gallium based solder suspended in an acid solution includes spreading a composite solder includes a liquid gallium based matrix with indium tin solder particles in suspension within the liquid gallium based matrix.

Example 19 includes the composite solder of any one of examples 17-18, wherein spreading a liquid gallium based solder suspended in an acid solution includes spreading a composite solder includes a liquid gallium based matrix with silver tin solder particles in suspension within the liquid gallium based matrix.

Example 20 includes the composite solder of any one of examples 17-19, wherein the electrical contact includes copper.

Example 21 includes the composite solder of any one of examples 17-20, wherein spreading a liquid gallium based solder suspended in an acid solution across an electrical contact includes spreading a liquid gallium based solder suspended in an acid solution across an array of thousands of electrical contacts.

Example 22 includes the composite solder of any one of examples 17-21, wherein spreading a liquid gallium based solder suspended in an acid solution across an electrical contact includes spreading a liquid gallium based solder suspended in an acid solution across an array of first level interconnect structures in a chip package.

These and other examples and features of the present molds, mold systems, and related methods will be set forth in part in the following detailed description. This overview is intended to provide non-limiting examples of the present subject matter—it is not intended to provide an exclusive or exhaustive explanation. The detailed description below is included to provide further information about the present molds, mold systems, and methods.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method, comprising:
   forming a resist pattern surrounding an exposed electrical contact;
   placing a gallium based solder over the resist pattern and the electrical contact;
   wherein the gallium based solder comprises a gallium based matrix and a distribution of dispersed phase particles,
   reflowing the gallium based solder on the electrical contact;
   and removing the resist pattern.

2. The method of claim 1, wherein placing a gallium based solder over the resist pattern and the electrical contact includes placing a number of gallium based solder particles suspended in a solvent matrix over the resist pattern and the electrical contact.

3. The method of claim 1, wherein placing a gallium based solder over the resist pattern and the electrical contact includes placing a composite solder over the resist pattern and the electrical contact, wherein the composite solder includes a liquid gallium based matrix with indium tin solder particles in suspension within the liquid gallium based matrix.

4. The method of claim 1, wherein placing a gallium based solder over the resist pattern and the electrical contact includes placing a composite solder over the resist pattern and the electrical contact, wherein the composite solder includes a liquid gallium based matrix with copper particles in suspension within the liquid gallium based matrix.

5. The method of claim 4, wherein a copper fraction in the composite solder is between approximately 1 percent and 30 percent by volume.

6. The method of claim 1, wherein placing a gallium based solder over the resist pattern and the electrical contact includes placing a liquid gallium based solder suspended in an acid solution over the resist pattern and the electrical contact.

7. The method of claim 1, wherein placing a gallium based solder over the resist pattern and the electrical contact includes spreading a gallium based solder over the resist pattern and across an array of thousands of electrical contacts.

8. The method of claim 7, wherein spreading the gallium based solder spreading the gallium based solder across an array of first level interconnect structures in a chip package.

* * * * *